July 11, 1933. F. GOERTZ ET AL 1,917,365
STRUCTURAL JOINT
Filed July 27, 1931
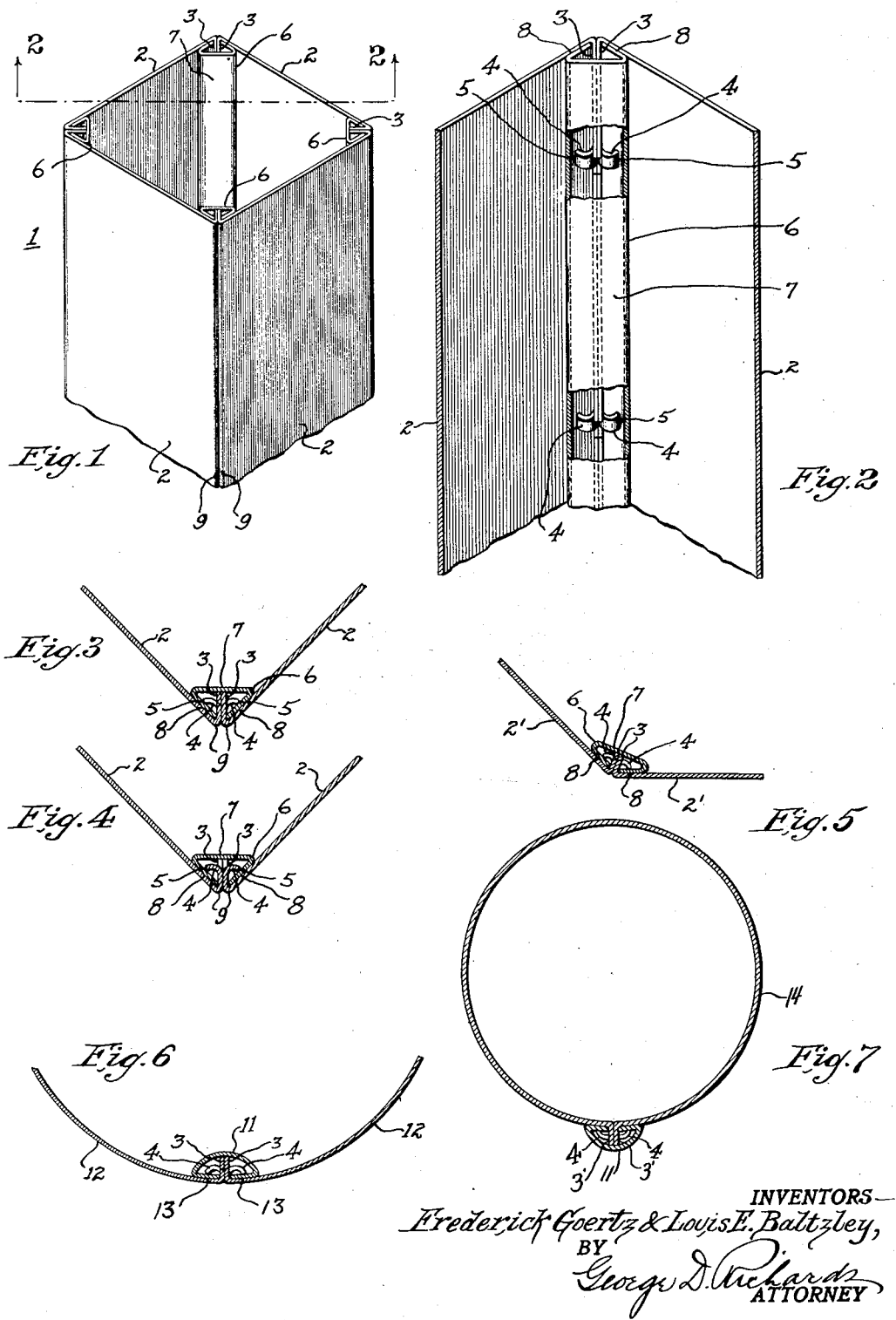
INVENTORS
Frederick Goertz & Louis E. Baltzley,
BY
George D. Richards
ATTORNEY Patented July 11, 1933

1,917,365

UNITED STATES PATENT OFFICE

FREDERICK GOERTZ, OF SOUTH ORANGE, AND LOUIS E. BALTZLEY, OF GLEN RIDGE, NEW JERSEY, ASSIGNORS TO AUGUST GOERTZ & CO., INC., A CORPORATION OF NEW JERSEY

STRUCTURAL JOINT

Application filed July 27, 1931. Serial No. 553,368.

This invention relates, generally, to joints or connecting means; and the invention has reference, more particularly, to a novel structural joint adapted for joining sheet or plate members disposed at various angles with respect to one another.

Heretofore, in joining sheet or plate members it has been common to rivet, bolt, weld, solder or braze the members together, either directly or through the intermediary of a connecting strip or angle plate. Each of these methods of joining the members are open to certain objections and the completed joints are ofttimes unattractive in appearance and sometimes even unreliable in use. Also, plate members as thus joined are usually permanently connected together so that it is impracticable thereafter to separate the same.

The principal object of the present invention is to provide a novel structural joint or juncture means for connecting sheets or plates disposed at any desired angle with respect to one another, the said joint possessing great strength and rigidity and presenting an extremely attractive appearance.

Another object of the present invention lies in the provision of a novel structural joint which is adapted to be easily and quickly manipulated to effect the rigid connection of sheets or plates and is as easily manipulated to effect the quick disconnection of the same when desired.

Still another object of the present invention is to provide a novel structural joint which is of simple rugged construction, the same comprising a yoke member having the form of a longitudinally split tube which is adapted to conform to the angle of juncture of the sheets or plates connected by the joint, the said yoke member cooperating with the projections formed on the plates to thereby lock the plates together.

Other objects of this invention, not at this time more particularly enumerated, will be clearly understood from the following detailed description of the same.

The invention is clearly illustrated in the accompanying drawing, in which:

Fig. 1 is a perspective view of a square column or similar member made up of four plates connected together by the novel structural joint of the present invention.

Fig. 2 is an enlarged perspective view taken substantially along the line 2—2 of Fig. 1 with parts broken away to better illustrate the details of construction.

Fig. 3 is a sectional view of the structure shown in Fig. 2, the said section being taken intermediate consecutive pairs of turned-over holding lugs.

Fig. 4 is a sectional view similar to Fig. 3 but with the section taken directly through a pair of turned-over lugs.

Fig. 5 is a view similar to Fig. 3 but illustrates the connected plates extending at an angle differing from the angle illustrated in Fig. 3.

Fig. 6 is a sectional view illustrating the use of the joint of this invention for connecting curved plates; and Fig. 7 is a view similar to Fig. 6 but illustrates the joint positioned on the reverse side of the plate.

Similar characters of reference are employed in all of the above described views to indicate corresponding parts.

Referring now to Figs. 1 to 4 of the said drawing, the reference numeral 1 designates a square column or analogous structure consisting of a plurality of plate members 2 which are interconnected at their vertical side edges by the novel structural joints of the present invention. These joints comprise flanges 3 formed on the side marginal edges of the plates 2. The flanges 3 are formed by bending the side marginal edge portions of each of the plates 2 at an angle to the body of the plate, which angle is substantially equal to one-half of the total angle between the adjoining plates, so that the flanges 3 of the adjoining plates meet face to face so as to abut one another as shown in the drawing. At intervals along the length of the flanges 3, these flanges are cut out to form lugs 4 which are turned or bent over toward the main body of their respective plates. The inner free end 5 of each of the lugs 4 lies closely adjacent the surface of the plate to which the lug is integrally secured.

The lugs 4 are illustrated as disposed in horizontally aligned pairs, each pair being made up of one lug from each of two adjoining plates. Instead of having the lugs 4 of the adjoining plates 2 in horizontal alignment with one another, as shown in Fig. 2, these lugs may be staggered if desired, in which case the lug formed on one plate 2, will lie opposite an uninterrupted portion of the flange 3 of the adjoining plate 2. These lugs possess a degree of resiliency for purposes to be presently referred to.

A vertically extending yoke member 6 having the form of a split or longitudinally slitted tube is adapted by engaging lugs 4 and the adjoining surfaces of the plate 2, to lock adjoining plates together. The yoke member 6 consists of a main or back portion 7 and two flanges 8 formed along the side edges of the back portion 7. The flanges 8 converge toward one another and the angle between these flanges is the same as the desired angle between adjoining plates 2, 2. In other words, if the adjoining plates 2, 2 are to be connected so as to extend at right angles to one another, as illustrated in Figs. 1 to 4 of the drawing, then the angle between the flanges 8, 8 of each yoke member 7 is also a right angle, whereas the angle between each of the flanges 3 and its respective plate 2 is half of a right angle or forty-five degrees.

In assembling two of the plate members 2, the flanges 3 are brought into meeting or abutting relation as shown in Fig. 2, and the yoke member 6 is then slid lengthwise between the adjoining plates 2, 2, so that the flanges 3 enter the slit of the yoke member and project into the hollow interior of the same. The flanges 8 of this yoke member slide under the ends 5 of the lugs 4, which ends press the flanges 8 against the plates 2, due to the resiliency of said lugs. Since the ends 5 of lugs 4 are closely adjacent the surfaces of plate 2, the flanges 8 are firmly gripped between the ends 5 and the surfaces of the plates. With the yoke member assembled upon the plates 2, as shown in the figures, a very rigid connection of the plates is obtained. The great rigidity of this connection is due to the relatively large area of contact between the yoke member and the plates and to the fact that the lugs 4 bind the yoke member to the plates at regular intervals. The lugs 4 by engaging the inner sides of the flanges 8 positively prevent the angle between the adjoining plates 2, 2 from increasing, whereas the outer surfaces of the flanges 8 by engaging the marginal edge portions of the plates 2, 2 prevent these plates from moving toward one another so as to decrease the angle therebetween. Also, the flanges 3 of the thus connected plates are held positively in abutting relation by the action of the yoke member and lugs 4 and serve as an additional means to prevent the decreasing of the angle between the adjoining plates and also serve to enhance the rigidity of the connection.

With the plates assembled by means of the yoke 6, a very neat and attractive joint is formed. Thus, when this joint is viewed exteriorly, as by looking at the outer side of Fig. 1, it will be noted that very attractive corners are formed at the juncture of adjacent plates. This is due to the bending over of the marginal edge portions of the plate to form flanges 3, thereby forming dual quarter-rounds 9 which are largely exposed at the exterior of the object, as shown in Fig. 1. These quarter-rounds 9 give the column or other article, a very atractive appearance on the outside and lend an appearance of strength to the column or other object, while at the same time eliminating sharp cut edges. As viewed from the interior of the column, the yoke member 6 also presents a very attractive appearance and serves as a dividing panel for breaking up the monotony of the main panels 2. With the yoke member 6 assembled upon adjoining plates 2, a very rigid joint is formed owing to the relatively large moment of inertia of the cross sectional area of the joint. This cross sectional area is of substantially triangular shape as will be particularly noted in Figs. 3 and 4 and enables the joint to successfully withstand relatively large compressive or bending stresses.

Since to assemble the joint it is merely necessary to slide the yoke member 6 over the flanges 3 and lugs 4, it will be evident that the assembling operation may be performed quickly and easily. Likewise, to disassemble the joint it is merely necessary to reverse the operation by sliding the yoke member 6 lengthwise off of the flanges 3 and lugs 4. With the joint assembled as in Fig. 1, the resulting column or other member so formed has great strength and rigidity and may be used wherever a rigid structure is required.

It will be apparent that the novel joint of this invention may be designed to connect plates at any desired angle. Thus, in Fig. 5 the joint has been designed to connect plates 2', 2' which are separated by an angle which is larger than 90°. Fig. 6 shows the novel joint of the present invention applied to curved plates 12, 12. In this case the body or back portion 11 of the yoke is curved instead of being flat as in the preceding views, and the flanges 13 of the yoke member are curved to conform to the inner surface of the curved plates 12. Fig. 7 shows a single plate 14 bent into cylindrical shape with its meeting edge portions secured by the novel joint of the present invention. In the showing of Fig. 7 the joint is slightly modified from that of Fig. 6 in that the flanges 3' of the plate edge portions project outwardly, and the yoke member 11 in this case is on the outer side of the curved plate 14 instead of on the inner side, as shown in Fig. 6.

The novel joint of the present invention is adapted to connect plates or similar members in many fields of use. Thus, containers, columns, beams and other structures may be built up by using the joint of the present invention. It will be apparent that instead of using a plurality of plates to form a column or container as shown in Fig. 1, a single plate may be used; the said plate being bent into any desired shape, such as the shape of the column of Fig. 1, and the meeting edge portions of the plate are then joined by the joint of this invention. In this way stove-pipes or other articles at relatively low cost may be made, such as suggested in Fig. 7.

It is to be understood that the lugs 4 may have various shapes other than that shown in the drawing, for example, these lugs may be formed as by pressing small portions such as domes out of the flanges 3. In some instances, for example in three-sided or triangular columns for containers the lugs 4 may be omitted altogether.

The joint of this invention enables the use of relatively light sheet material in constructing columns or containers. This is because of the relative great strength of the joints, which, occurring as they do at the corners of the columns or receptacles, serve to reenforce the receptacle at the points most apt to be injured. Since the joint of the present invention may be assembled without hammering or other disturbing influence, the same may be used for connecting enameled or otherwise completely finished plates without injuring the finish of the plates or plate used.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In combination, a pair of adjoining plates having marginal edges arranged to be connected to one another, a joint for interconnecting the marginal edges of said plates, said joint comprising spaced lugs projecting from the marginal edge portions of each of said plates, each of said lugs being bent over into substantially C-shape and positioned in overlying relation to its respective plate with the free end of said lug positioned closely adjacent the plate, and a yoke member for cooperating with said lugs to thereby secure said plates together, said yoke member comprising a slitted tube adapted, in assembling the joint, to be slid longitudinally over said lugs so that said lugs project through the slit of said tube and the free ends of the lugs press the sides of said tube against said plates to lock said plates to said tube and to one another.

2. A structural joint for connecting two adjacent plates, said joint comprising lugs formed on the adjacent marginal edge portions of said plates, each of said lugs being turned over into C-shape with the free end thereof positioned in overlying relation to its respective plate, the overlying free end portion of each of said lugs being closely adjacent its respective plate, and a yoke member comprising a longitudinally slitted tube, said tube having flanges adapted to be slid longitudinally between said lugs and said plates so that said lugs project through the slit in said tube with their free end portions engaging the inner wall of said tube to thereby bind said tube to said plates.

3. A structural joint for releasably connecting two adjacent plates, said joint comprising a plurality of spaced C-shaped lugs formed on the adjacent marginal edge portions of both of said plates, each of said lugs being turned over into overlying relation to its respective plate, said lugs being arranged in pairs with a lug of each plate constituting one lug of a pair, the overlying free end portion of each of said lugs being closely adjacent its respective plate, and a yoke member comprising a longitudinally slitted tube, said tube being adapted to be slid longitudinally over said lugs so that the latter project through the slit in said tube and press the tube walls against said plates to thereby bind said plates to said tubes, said tube when slid off of said lugs serving to disconnect said plates.

4. A structural joint for connecting two adjacent plates, said joint comprising flanges formed on adjacent edge portions of said plates, said flanges being cut away to provide lugs at intervals along their lengths, each of said lugs being turned over into C-shape with the free end portion thereof positioned in close proximity to its respective plate, and a yoke member having the form of a slitted tube arranged to engage said lugs and said flanges to hold said plates together, said yoke member being longitudinally slidable over said flanges and lugs so that the free ends of said lugs abut the inner walls of said yoke member to press the same firmly against said plates.

5. A structural joint for releasably connecting two adjacent plates disposed at an angle with respect to one another, said joint comprising flanges formed on the adjacent edge portions of said plates, each of said flanges projecting from its respective plate at an angle thereto equal to substantially one-half of the angle between said plates, whereby said flanges are adapted to abut one another when the joint is assembled, said flanges being struck out at spaced intervals along their lengths to provide lugs, each of said lugs being turned over into close proximity to its respective plate, and a yoke member having the form of a slitted tube arranged to engage said lugs and said flanges to hold said plates together, said yoke member being longitudinally slidable over said flanges and lugs so that said lugs engage the inner walls of said yoke member to press the same firmly against said plates, said yoke member being shaped to conform to the angle between said plates.

6. A structural joint for connecting plates in angular relation one to another, comprising marginal meeting flanges formed along the meeting edges of adjoining plates and adapted to abut together, a yoke member having its free marginal portions formed to provide flanges to respectively abut the faces of adjoining plates, the free edges of said latter flanges being respectively seated in the angular recess lying between said plates and their meeting flanges, and said meeting flanges of said plates having resilient spaced holding lugs struck inwardly therefrom to engage the flanges of said yoke and press said yoke flanges into closely abutting relation at spaced points to said plates.

In testimony, that we claim the invention set forth above we have hereunto set our hands this 23rd day of July, 1931.

FREDERICK GOERTZ.
LOUIS E. BALTZLEY.